(12) United States Patent
Hiyama

(10) Patent No.: US 10,978,953 B2
(45) Date of Patent: Apr. 13, 2021

(54) FLYBACK POWER SUPPLY, INVERTER AND ELECTRICALLY POWERED VEHICLE

(71) Applicant: Mitsubishi Electric Corporation, Tokyo (JP)

(72) Inventor: Kazuaki Hiyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/072,511

(22) PCT Filed: May 26, 2016

(86) PCT No.: PCT/JP2016/065624
§ 371 (c)(1),
(2) Date: Jul. 25, 2018

(87) PCT Pub. No.: WO2017/203666
PCT Pub. Date: Nov. 30, 2017

(65) Prior Publication Data
US 2019/0043664 A1    Feb. 7, 2019

(51) Int. Cl.
| | | |
|---|---|---|
| H02M 3/335 | (2006.01) | |
| H02M 3/28 | (2006.01) | |
| H02M 1/00 | (2006.01) | |
| H01F 27/00 | (2006.01) | |
| H01F 27/30 | (2006.01) | |
| H01F 30/04 | (2006.01) | |
| H02M 7/538 | (2007.01) | |

(52) U.S. Cl.
CPC ......... *H02M 3/33507* (2013.01); *H02M 3/28* (2013.01); *H01F 27/004* (2013.01); *H01F 27/30* (2013.01); *H01F 30/04* (2013.01); *H02M 3/33561* (2013.01); *H02M 7/53803* (2013.01); *H02M 2001/0064* (2013.01)

(58) Field of Classification Search
USPC ......................................... 363/21.12–21.1, 71
See application file for complete search history.

(56) References Cited

U.S. PATENT DOCUMENTS

| | | | |
|---|---|---|---|
| 4,809,151 A * | 2/1989 | Ota ....................... | H02M 3/335 363/21.12 |
| 5,729,448 A | 3/1998 | Haynie et al. | |
| 2004/0190312 A1* | 9/2004 | Takada ................... | H02M 3/28 363/21.12 |

(Continued)

FOREIGN PATENT DOCUMENTS

| | | |
|---|---|---|
| CN | 102570823 A | 7/2012 |
| DE | 10218455 A1 | 11/2003 |

(Continued)

OTHER PUBLICATIONS

International Search Report issued in PCT/JP2016/065624; dated Aug. 9, 2016.

(Continued)

*Primary Examiner* — Alex Torres-Rivera
(74) *Attorney, Agent, or Firm* — Studebaker & Brackett PC

(57) ABSTRACT

Primary-side windings of the transformers (T1,T2,T3) are connected in parallel to each other. A switch (SW) turns on/off primary side currents of the transformers (T1,T2,T3). Each transformer (T1,T2,T3) includes a plurality of secondary-side windings.

7 Claims, 15 Drawing Sheets

(56) References Cited

U.S. PATENT DOCUMENTS

| | | | |
|---|---|---|---|
| 2004/0217735 A1* | 11/2004 | Chitsazan | H02J 7/0018 320/116 |
| 2005/0213352 A1 | 9/2005 | Lys | |
| 2011/0266970 A1 | 11/2011 | Cohen | |
| 2012/0119676 A1* | 5/2012 | Yao | H01F 38/42 315/297 |
| 2012/0134181 A1 | 5/2012 | Amano et al. | |
| 2015/0085536 A1 | 3/2015 | Miyauchi et al. | |
| 2016/0036340 A1 | 2/2016 | Kikuchi et al. | |

FOREIGN PATENT DOCUMENTS

| | | |
|---|---|---|
| JP | S62-196071 A | 8/1987 |
| JP | H03-198656 A | 8/1991 |
| JP | H07-264853 A | 10/1995 |
| JP | H09-019139 A | 1/1997 |
| JP | H10-174434 A | 6/1998 |
| JP | 2010-088152 A | 4/2010 |
| JP | 2010-284029 A | 12/2010 |
| JP | 2011188738 A | 9/2011 |
| JP | 2012-120304 A | 6/2012 |
| JP | 2015-065726 A | 4/2015 |
| JP | 2016036242 A | 3/2016 |

OTHER PUBLICATIONS

Written Opinion issued in PCT/JP2016/065624; dated Aug. 9, 2016.
Notification of Transmittal of the International Search Report and the Written Opinion of the International Searching Authority, or the Declaration issued in PCT/JP2016/065624; dated Aug. 9, 2016.
An Office Action mailed by the Japanese Patent Office dated May 7, 2019, which corresponds to Japanese Patent Application No. 2018-518894 and is related to U.S. Appl. No. 16/072,511.
An Office Action mailed by the Japanese Patent Office dated Sep. 3, 2019, which corresponds to Japanese Patent Application No. 2018-518894 and is related to U.S. Appl. No. 16/072,511.
An Office Notice mailed by the Japanese Patent Office dated Nov. 26, 2019, which corresponds to Japanese Patent Application No. 2018-518894 and is related to U.S. Appl. No. 16/072,511; with English language translation.
An Office Action mailed by the State Intellectual Property Office of the People's Republic of China dated Mar. 18, 2020, which corresponds to Chinese Patent Application No. 201680085949.3 and is related to U.S. Appl. No. 16/072,511 with English language translation.
An Office Action mailed by the German Patent Office dated Apr. 14, 2020, which corresponds to German Patent Application No. 112016006903.0 and is related to U.S. Appl. No. 16/072,511; with English language translation.
An Office Action; "Notice of Reasons for Refusal," mailed by the Japanese Patent Office dated Aug. 18, 2020, which corresponds to Japanese Patent Application No. 2018-518894 and is related to U.S. Appl. No. 16/072,511 with English language translation.
Office Action mailed by China National Intellectual Property Administration dated Feb. 3, 2021, which correspond to Chinese Patent Application No. 201680085949.3 and is related to U.S. Appl. No. 16/072,511 with English language translation.

* cited by examiner

FLYBACK POWER SUPPLY, INVERTER AND ELECTRICALLY POWERED VEHICLE

FIELD

The present invention relates to a flyback power supply, an inverter and an electrically powered vehicle having plural secondary-side outputs.

BACKGROUND

A flyback type, a forward type, a push-pull type and a half/full bridge type are known for switching power supplies in which an input (primary side) and an output (secondary side) are insulated from each other. A transformer is used for insulation in all the types.

Particularly, a flyback power supply has a small number of components, and is used as a compact/small capacity power supply of 100 W or less in capacity. When plural secondary-side outputs are required, plural secondary-side windings are provided in a transformer according to the required number of outputs.

A power supply using a transformer having plural secondary-side windings which are provided according to the number of secondary-side outputs is called as a centralized type power supply. For example, when the number of secondary-side outputs is equal to 4, the transformer has a configuration including one primary winding and four secondary-side windings. On the other hand, a configuration including plural power supplies each of which has one output or a small number of outputs is called as a distributed type power supply (see PTL 1, for example).

CITATION LIST

Patent Literature

[PTL 1] JP 2012-120304 A

SUMMARY

Technical Problem

In order to insulate an input (primary side) from plural outputs (secondary side), it is required to insulate respective windings of a transformer. Since an insulating material or a spacer corresponding an insulation voltage is required between respective windings in order to ensure the insulation, the centralized type power supply has a problem that the outer shape of the transformer increases in size. The flyback power supply has a merit that the number of components is smaller and the mounting area can be reduced as compared with the other type power supplies, but the height of the overall power supply increases when the size of the transformer increases. Furthermore, when the size of the transformer increases, the weight thereof also increases proportionally, and thus there is a risk that the transformer or a printed circuit board having the transformer mounted thereon is broken under an environment having large vibration.

In the case of the distributed type power supply, since the number of secondary-side windings of each of the transformers is one or a small number, the size of the outer shape of the transformer thereof can be made smaller than that of the centralized type power supply, and the height of the overall power supply can be made lower than that of the centralized type power supply. Furthermore, the increase in size of the transformer can be avoided, thus the power supply can be prevented from being broken even under an environment having large vibration. However, since the distributed type power supply has a larger number of components, it has a problem that the mounting area and the cost of components increase as compared with the centralized type power supply.

The present invention has been implemented to solve the foregoing problems, and has an object to provide a flyback power supply, an inverter and an electrically powered vehicle that can reduce the number of components as compared with the distributed type power supply, and also can realize miniaturization and reduction in cost as compared with the centralized type power supply.

Solution to Problem

A flyback power supply according to the present invention includes: a plurality of transformers; and a switch turning on/off primary side currents of the transformers, wherein primary-side windings of the transformers are connected in parallel to each other, and each transformer includes a plurality of secondary-side windings.

Advantageous Effects of Invention

In the present invention, primary-side windings of the transformers are connected in parallel to each other, and each transformer includes a plurality of secondary-side windings. Therefore, the number of components can be reduced as compared with the distributed type power supply, and the miniaturization and the reduction in cost can be realized as compared with the centralized type power supply.

DESCRIPTION OF EMBODIMENTS

A flyback power supply, an inverter and an electrically powered vehicle according to the embodiments of the present invention will be described with reference to the drawings. The same components will be denoted by the same symbols, and the repeated description thereof may be omitted.

First Embodiment

Figure 1:
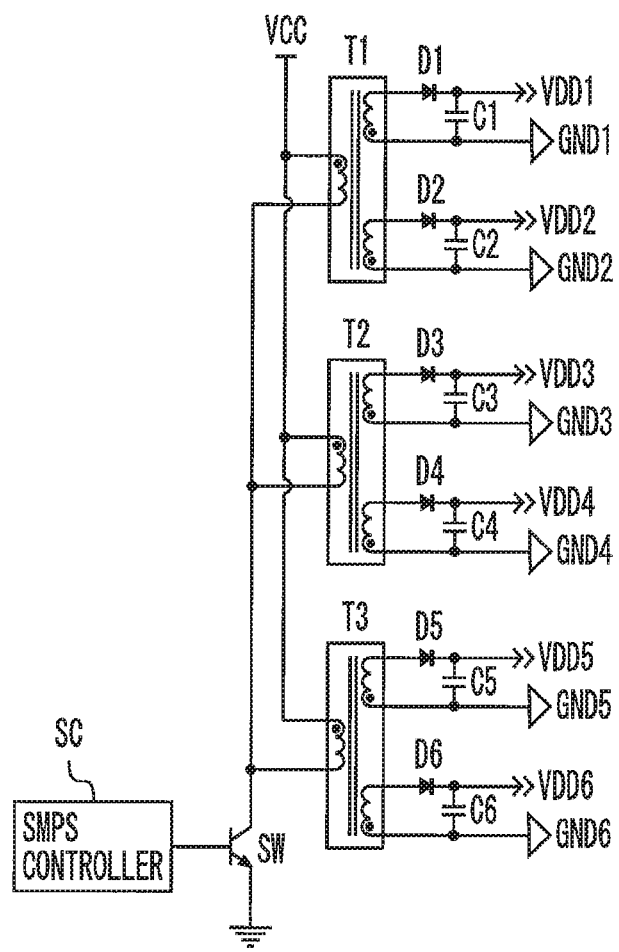
FIG. 1 is a circuit diagram showing a flyback power supply according to a first embodiment of the present invention.

FIG. 1 is a circuit diagram showing a flyback power supply according to a first embodiment of the present invention. Primary-side windings of transformers T1, T2 and T3 are connected in parallel to each other between a power supply terminal VCC and a switch SW. The switch SW is a semiconductor switch connected between the ground terminal and one terminals of the primary-side windings of the transformers T1, T2 and T3, and turns on/off primary side currents of the transformers T1, T2 and T3.

The number of secondary-side windings of each of the transformers T1, T2 and T3 is equal to 2. Accordingly, the number of power supply outputs is equal to 6. Each of output capacitors C1 to C6 is connected in parallel to each of the six secondary-side windings of the transformers T1, T2 and T3. Rectifying diodes D1 to D6 are connected between the one ends of the six secondary-side windings of the transformers T1, T2 and T3 and the secondary-side outputs VDD1 to VDD6, respectively.

A power supply controller SC (SMPS CONTROLLER) controls the switch SW. In the power supply controller SC, any one of the plural secondary-side output voltages can be used as a feedback signal for stabilizing the output voltage. Alternatively, a flyback voltage occurring when the switch SW is turned off can be used as a feedback signal.

Figure 2:
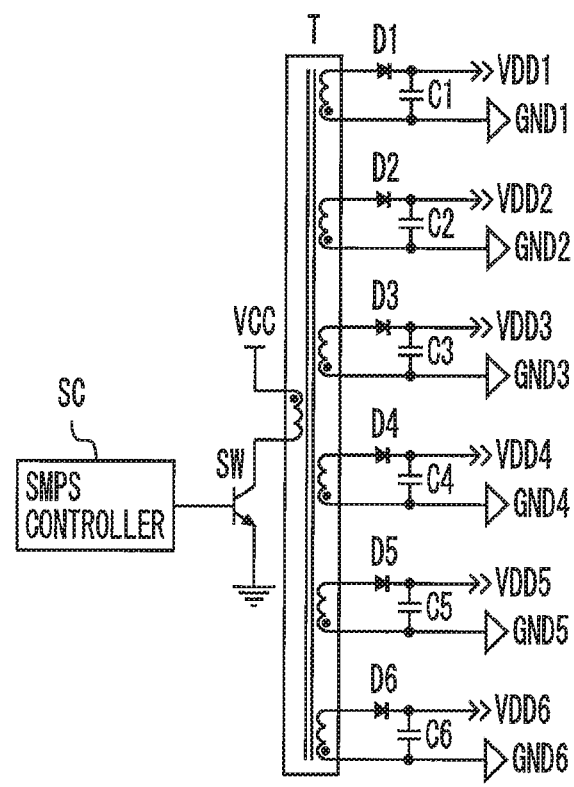
FIG. 2 is a diagram showing a centralized type 6-output flyback power supply according to a comparative example.

Subsequently, an effect of the present embodiment will be described in comparison with a comparative example. FIG. 2 is a diagram showing a centralized type 6-output flyback power supply according to a comparative example. It is necessary to prepare a transformer T having secondary-side windings whose number is equal to the number of the power supply outputs. In order to ensure the insulation between the primary-side winding and the secondary-side windings, an insulating material or a spacer is necessary between the windings. Therefore, the centralized type power supply has a problem that the outer shape of the transformer increases in size. Particularly, the size in the height direction of the transformer causes a problem. The transformer is largest among electronic components containing a controller to be mounted on a printed circuit board. Since the height of the transformer determines the height of the printed circuit board having the electronic components mounted thereon, the increase of the size of the transformer directly causes increase of the size of the overall power supply. Furthermore, the increase of the size of the transformer causes the weight thereof to increase proportionally, and thus there is a risk that the transformer or the printed circuit board having the transformer mounted thereon is broken under an environment having large vibration.

Figure 3:
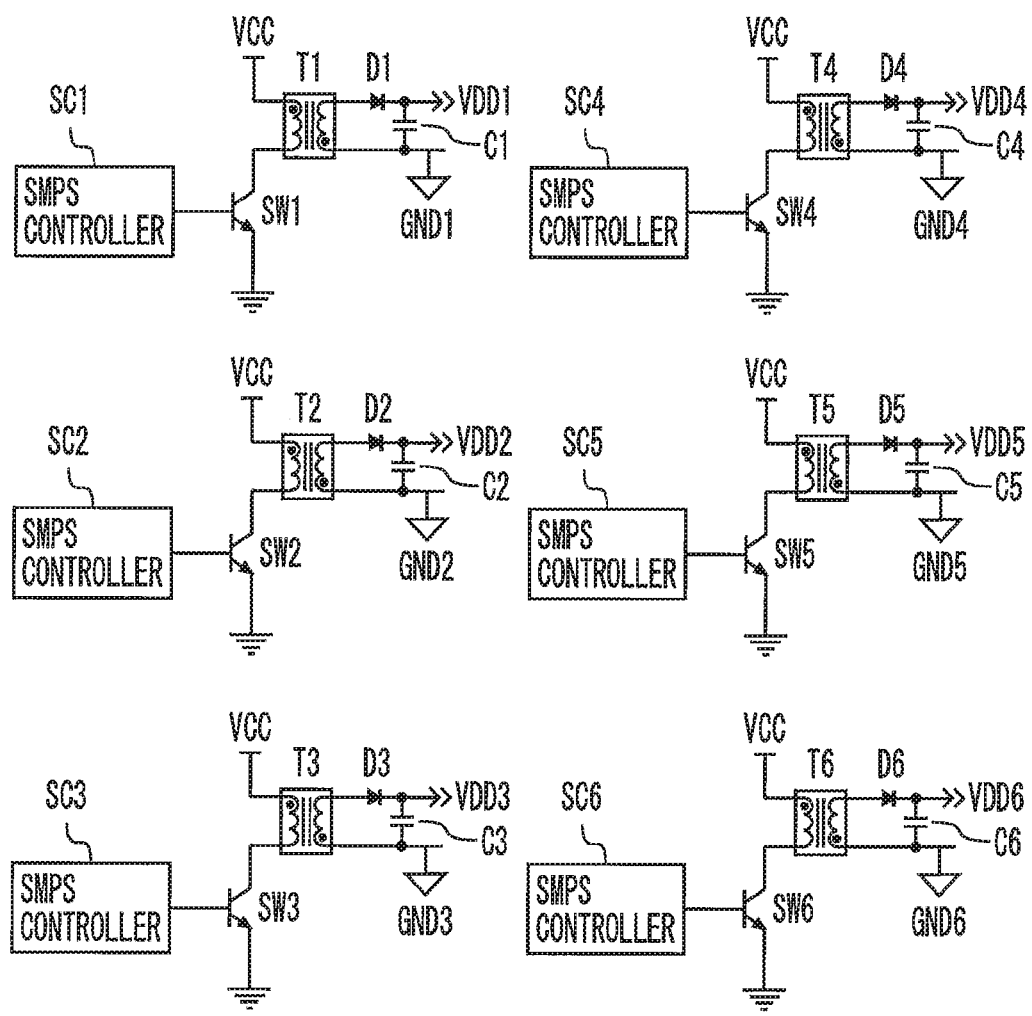
FIG. 3 is a diagram showing a distributed type 6-output flyback power supply according to a comparative example.
Figure 4:
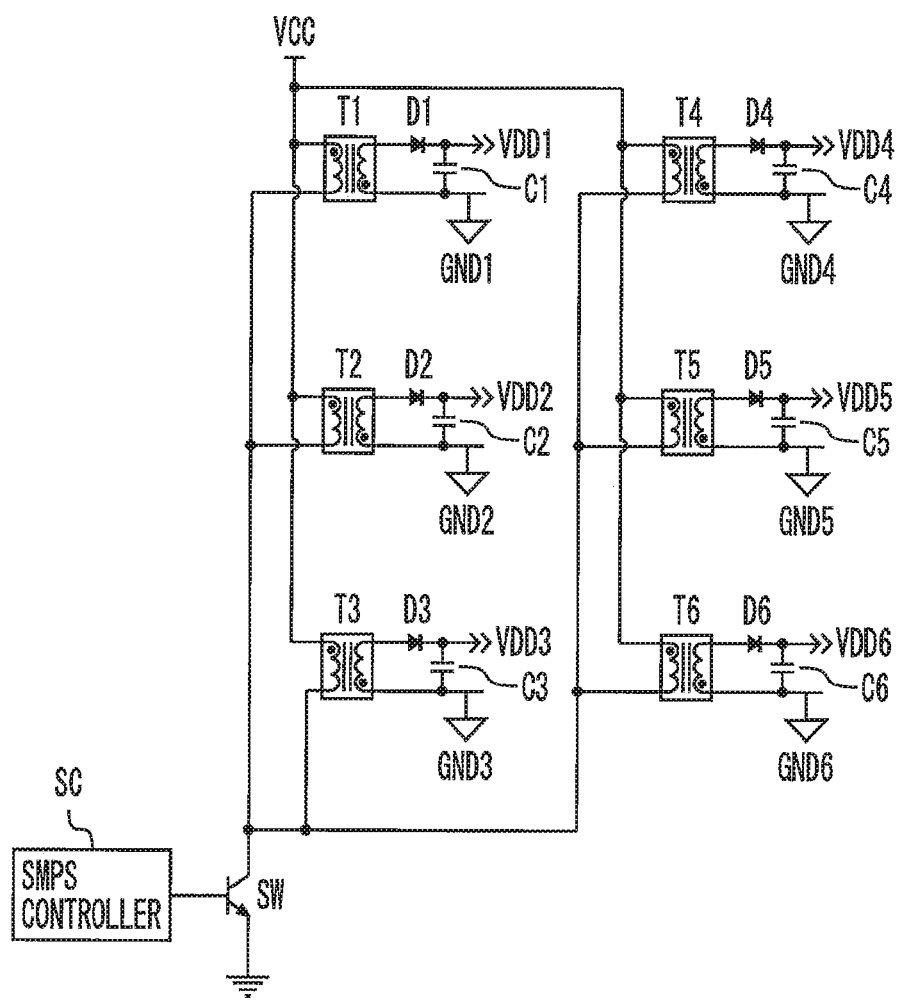
FIG. 4 is a diagram showing a distributed type 6-output flyback power supply according to a comparative example.

FIGS. 3 and 4 are diagrams showing a distributed type 6-output flyback power supply according to a comparative example. Since six transformers each of which has one secondary-side winding are used in the distributed type power supply, the size of the outer shape of each transformer is smaller than that of the transformer of the centralized type power supply. Accordingly, the size in the height direction of each transformer also becomes smaller, and a power supply circuit containing the transformer can be made thinner. Miniaturization of each transformer makes it possible to reduce the weight too. Accordingly, transformers each having a relatively large weight as an electrical component can be dispersedly arranged, thus stress to be applied to the printed circuit board under excitation can be reduced. Furthermore, the mechanical strength of the transformer can be also enhanced.

However, transformers whose number is equal to the number of power supply outputs are necessary in the distributed type power supply. Even when each transformer is made compact, the area occupied by the six transformers of the distributed type power supply is larger than one transformer of the centralized type power supply, thus the mounting area of the overall power supply increases. Furthermore, the total weight of the six transformers of the distributed type power supply is larger than the weight of one transformer of the centralized type power supply, thus the weight of the overall power supply also increases. The total cost of the plural compact transformers of the distributed type power supply exceeds the cost of one large-size transformer of the centralized type power supply. Furthermore, in FIG. 3, switches SW1 to SW6 and power supply controllers SC1 to SC6 whose numbers are equal to the number of power supplies are necessary, thus the mounting area of the controller and the cost of the components increase as compared with the centralized type power supply. Furthermore, in FIG. 4, when the number of power supply outputs increases, wiring for connecting the primary-side windings of the transformers in parallel becomes complicated, thus wiring impedance and inductance increase.

When the number of power supply outputs is equal to 6, in the transformer of the distributed type power supply according to the comparative example, the sum of the number of the primary-side windings and the number of the secondary-side windings of the transformers is equal to 2×6=12. In the centralized type power supply, it is equal to 7. In general, the size, weight and cost of the transformer are in positive correlation with the number of windings. The total number of windings of the distributed type power supply increases by about 71% as compared with that of the centralized type power supply. As described above, since the total number of windings increases in the transformer of the distributed type power supply because plural compact power supplies are used, the total weight and the total cost increase as compared with one transformer of the centralized type power supply.

Figure 5:
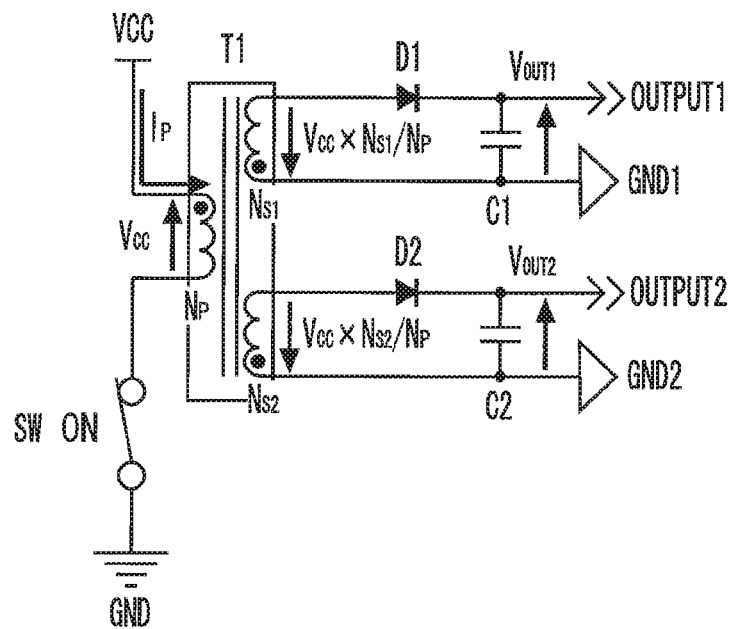
FIG. 5 is a diagram showing the principle of the operation of a centralized type 2-output flyback power supply according to a comparative example.
Figure 6:
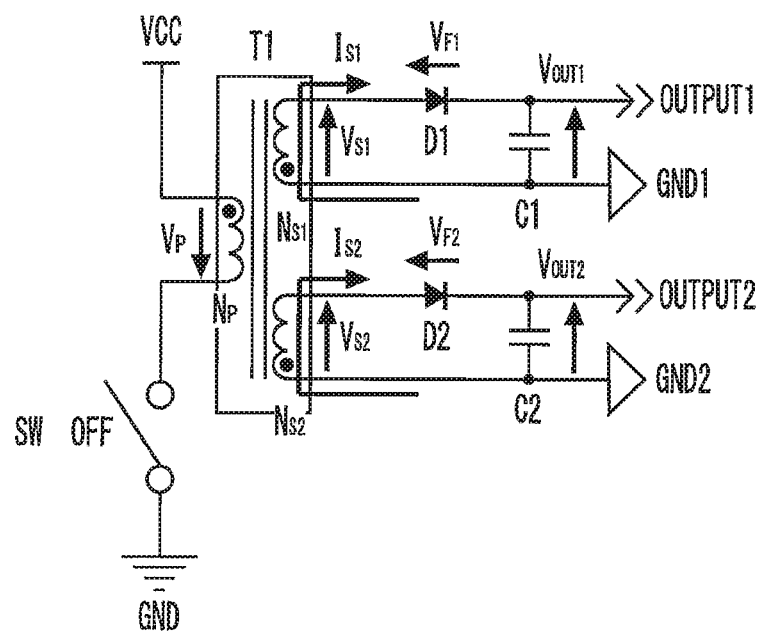
FIG. 6 is a diagram showing the principle of the operation of a centralized type 2-output flyback power supply according to a comparative example.
Figure 7:
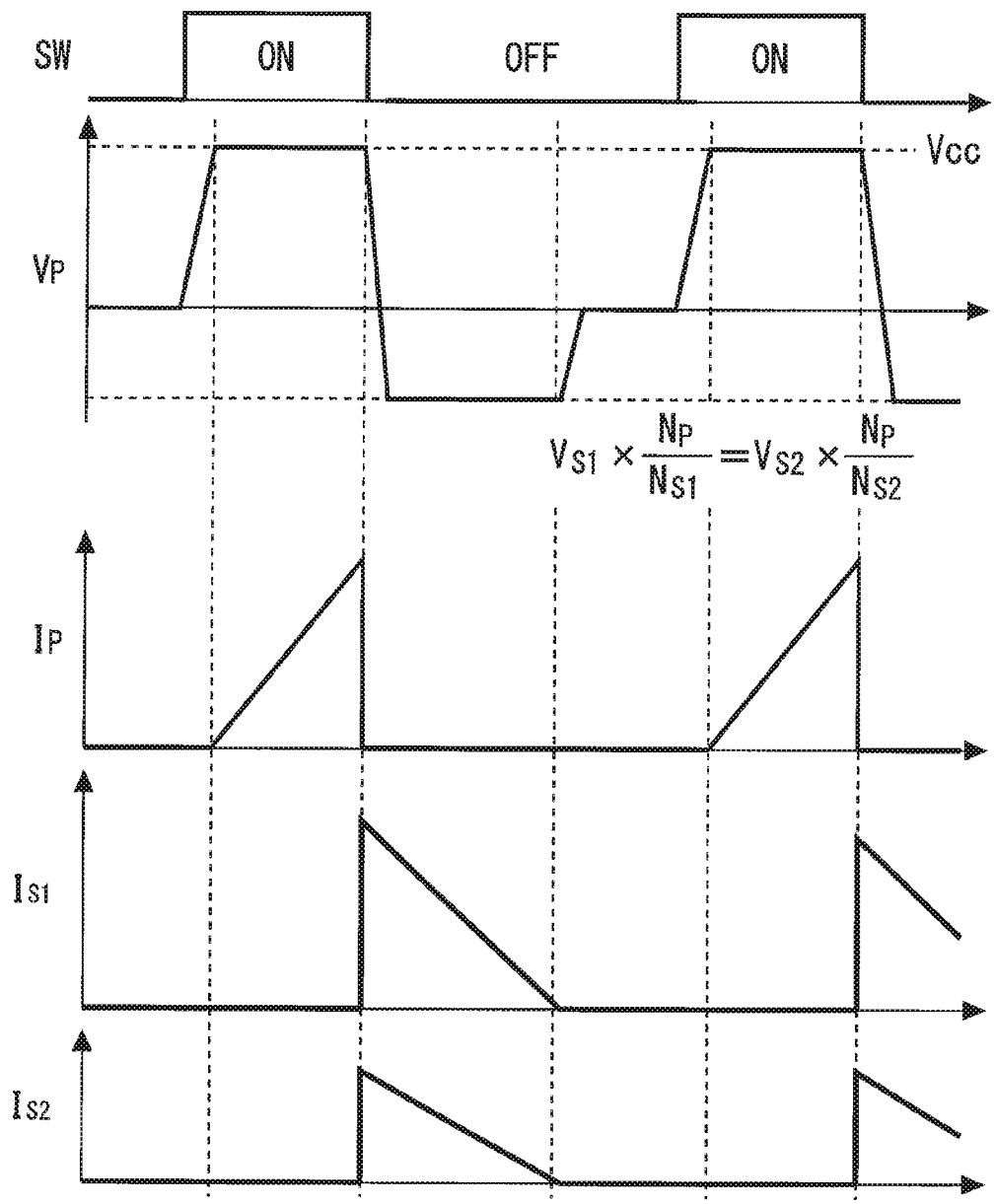
FIG. 7 is a diagram showing an operation waveform of the centralized type 2-output flyback power supply according to the comparative example.

FIGS. 5 and 6 are diagrams showing the principle of the operation of a centralized type 2-output flyback power supply according to a comparative example. FIG. 7 is a diagram showing an operation waveform of the centralized type 2-output flyback power supply according to the comparative example. When the switch SW is turned on, a power supply voltage $V_{CC}$ is applied to the primary-side winding as shown in FIG. 5. At the same time, voltages of $V_{CC} \times N_{S1}/N_P$ and $V_{CC} \times N_{S2}/N_P$ occur at the secondary-side windings, respectively. Here, $N_P$ represents the number of primary-side windings, and $N_{S1}$ and $N_{S2}$ represent the numbers of secondary-side windings, respectively. However, no current flows in the secondary-side windings due to the rectifying diodes D1 and D2 connected to the secondary-side windings. Therefore, the primary-side winding of the transformer T1 operates as an inductance, and the current of the primary-side winding satisfy $I_P = V_{CC}/L_P \times t$. Here, $L_P$ represents the inductance of the primary-side winding of the transformer T1, and t represents the ON-time of the switch SW. Excitation energy is accumulated in the core of the transformer T1 during an ON-period of the switch SW, and power is supplied from output capacitors C1 and C2 to loads connected to the secondary-side outputs OUTPUT 1 and OUTPUT 2. When currents supplied from the secondary-side outputs OUTPUT 1 and OUTPUT 2 to the loads increase, voltage drop amounts of the output capacitors C1 and C2 during the ON-period of the switch SW also increase.

When the switch SW is turned off, as shown in FIG. 6, an induced voltage is reversed to $V_P$ due to a transient response of the inductance of the primary-side winding. The induced voltages of the secondary-side windings are also reversed to $V_{S1}$ and $V_{S2}$, respectively. Currents $I_{S1}$ and $I_{S2}$ flow in the secondary-side windings to charge the output capacitors C1 and C2 connected to the secondary-side windings via the rectifying diodes D1 and D2. Power is supplied to the loads connected to the secondary-side outputs OUTPUT 1 and OUTPUT 2.

The relationship of the respective voltages when the switch SW is turned off is as follows: $V_P = V_{S1} \times N_P/N_{S1} = V_{S2} \times N_P/N_{S2}$. Furthermore, from $V_{S1} = V_{F1} + V_{OUT1}$ and $V_{S2} = V_{F2} + V_{OUT2}$, $(V_{F1} + V_{OUT1}) \times N_P/N_{S1} = (V_{F2} + V_{OUT2}) \times N_P/N_{S2}$. Here, $V_{F1}$ and $V_{F2}$ represent voltages to be applied to the rectifying diodes D1 and D2 respectively, and $V_{OUT1}$ and $V_{OUT2}$ represent secondary-side output voltages.

When the winding numbers of the two secondary-side windings are equal to each other ($N_{S1} = N_{S2}$), $V_{F1} + V_{OUT1} = V_{F2} + V_{OUT2}$. When the loads connected to the secondary-side outputs OUTPUT 1 and OUTPUT 2 are identical to each other (=currents to be supplied to the loads are equal to each other), the voltages across the output capacitors C1 and C2 when the switch SW is turned off satisfy $V_{OUT1} = V_{OUT2}$. $V_{F1} = V_{F2}$. Thus, the currents flowing in the secondary-side windings also satisfy $I_{S1} = I_{S2}$.

Next, there is considered a case where the winding numbers of the two secondary-side windings are equal to each other ($N_{S1} = N_{S2}$) and the load connected to the secondary-side output OUTPUT 1 is heavier than the load connected to the secondary-side output OUTPUT 2, that is, the current flowing in the load connected to the secondary-side output OUTPUT 1 is larger. During ON-period of the switch SW, current flowing from the output capacitor C1 on the secondary-side output OUTPUT 1 side to the load is larger than that on the OUTPUT 2 side, thus $V_{OUT1} < V_{OUT2}$ is satisfied when the switch SW is turned off. Therefore, from $V_{F1} - V_{F2} = V_{OUT2} - V_{OUT1} > 0$, the relationship of $V_{F1} > V_{F2}$ is satisfied. That is, $I_{S1} > I_{S2}$ is satisfied, and larger power is supplied to the secondary-side output OUTPUT 1 side having the heavier load. Through this operation, in the case of the flyback power supply having plural outputs, when loads connected to the secondary-side outputs are not uniform, larger power is supplied to a secondary-side winding having a heavier load, whereby the voltage drop of an output portion to which a heavy load is connected can be suppressed. That is, fluctuation of the output voltage caused by variation of the load can be suppressed.

Figure 8:
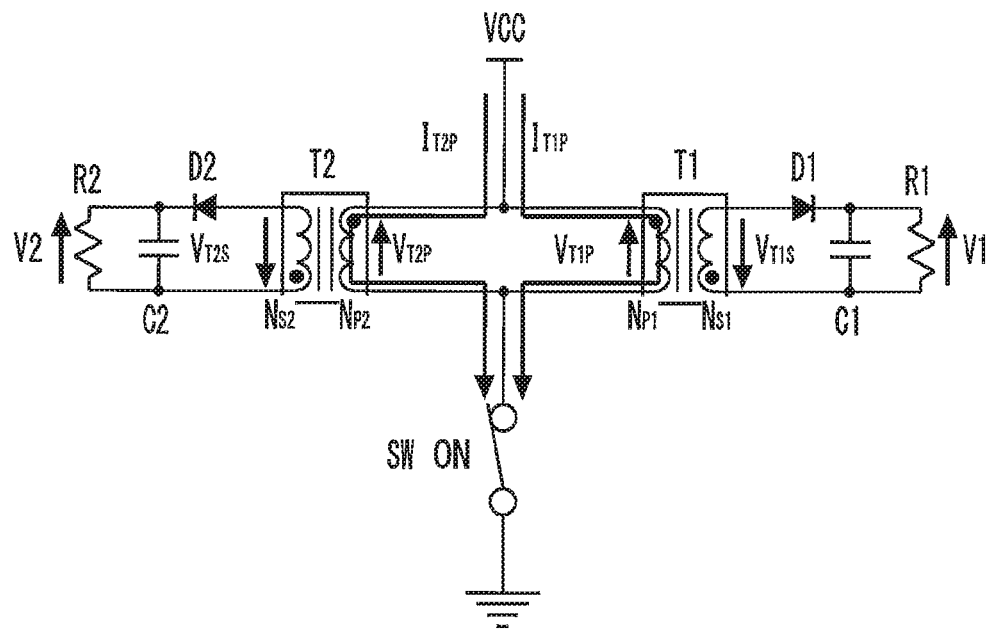
FIG. 8 is a diagram showing the principle of the operation of a distributed type 2-output flyback power supply according to a comparison example.
Figure 9:
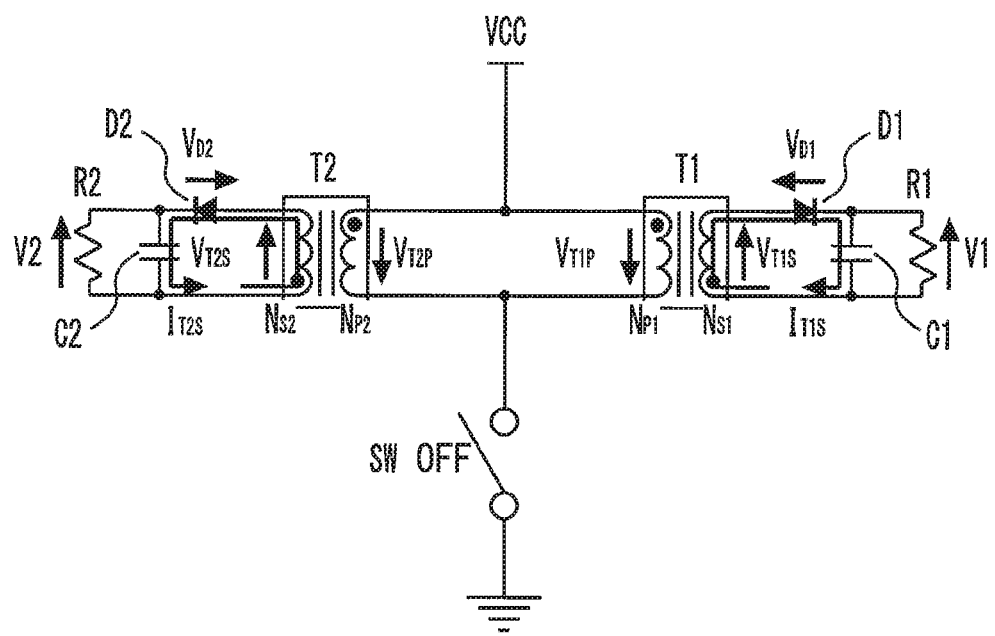
FIG. 9 is a diagram showing the principle of the operation of a distributed type 2-output flyback power supply according to a comparison example.
Figure 10:
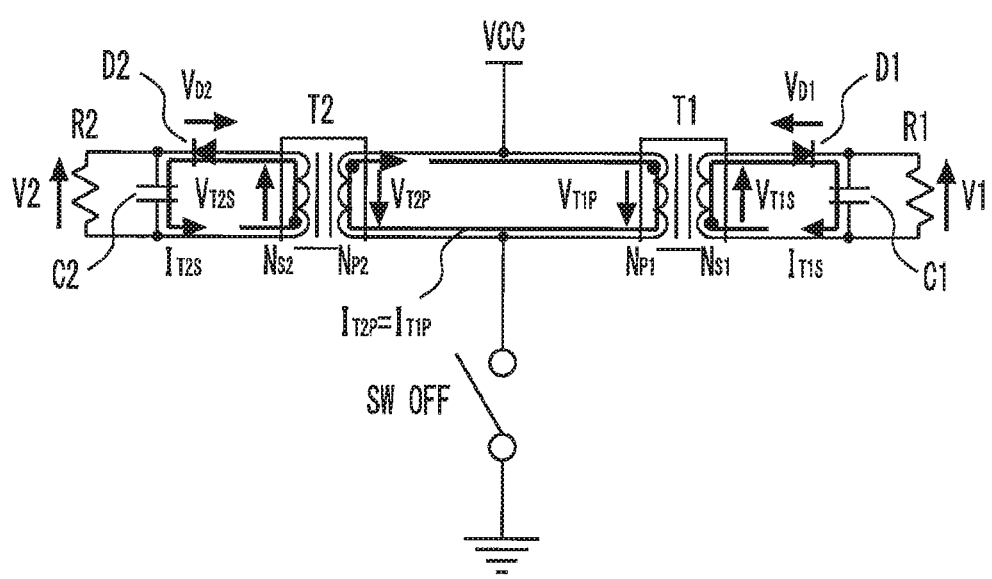
FIG. 10 is a diagram showing the principle of the operation of a distributed type 2-output flyback power supply according to a comparison example.

FIGS. 8 to 10 are diagrams showing the principle of the operation of a distributed type 2-output flyback power supply according to a comparison example. The primary side of a transformer T1 and a primary side of a transformer T2 are connected in parallel to each other. One common switch SW is used between a ground terminal and one terminals of the primary-side windings of the transformers T1 and T2. One controller is also provided for the switch SW. This power supply has a configuration which is not generally seen, and performs a unique operation when the switch SW is turned off. Therefore, a detailed operation thereof will be described below. In the following description, in order to simplify the description, it is assumed that the voltage drops of the switch SW and wires are negligibly small. Furthermore, it is also assumed that the winding resistance of the transformer is sufficient small, and the voltage drop of the winding resistance is negligibly small.

When the switch SW is turned on, currents $I_{T1P}$ and $I_{T2P}$ flow in the primary sides of the transformers T1 and T2 as shown in FIG. 8. At this time, voltages $V_{T1P}$ and $V_{T2P}$ applied to the primary-side windings of the transformers T1 and T2 respectively are equal to each other. During ON-period of the switch SW, downward voltages $V_{T1S}$ and $V_{T2S}$ occur on the secondary sides of the transformers T1 and T2 as in the case of the centralized type power supply of FIG. 5. However, no current flows in the secondary-side windings of the transformers T1 and T2 due to rectifying diodes D1 and D2. Excitation energy is accumulated in each of the cores of the transformers T1 and T2.

During ON-period of the switch SW, currents are supplied from the output capacitors C1 and C2 to loads R1 and R2 connected to secondary-side outputs respectively as in the case of the centralized type power supply of FIG. 5. Voltage fluctuations $\Delta V1$ and $\Delta V2$ of the output capacitors C1 and C2 during this period are as shown in the following expression 1, and the voltage fluctuation (=voltage drop) is larger as the load current is larger.

$$\Delta V1 = (\text{load current of } R1 \times \text{ON-time of } SW)/C1, \Delta V2 = (\text{load current of } R2 \times \text{ON-time of } SW)/C2 \quad \text{(expression 1)}$$

When the switch SW is turned off, the following phenomenon occurs due to excitation energy accumulated in the core of each of the transformers T1 and T2 as shown in FIG. 9. The induced voltage of the primary winding is reversed due to a transient response of the inductance of the primary-side winding. The induced voltage of the secondary-side winding is also reversed, and current flows in the secondary-side winding, thus the output capacitors C1 and C2 connected to the secondary-side windings via the rectifying diodes D1 and D2 are charged, and power is supplied to the loads R1 and R2 connected to the secondary-side outputs. $V_{T1P}$ and $V_{T2P}$ are represented by the following expression.

$$V_{T1P} = V_{T1S} \times N_{P1}/N_{S1} = (V1 + V_{D1}) \times N_{P1}/N_{S1},$$
$$V_{T2P} = V_{T2S} \times N_{P2}/N_{S2} = (V2 + V_{D2}) \times N_{P2}/N_{S2} \quad \text{(expression 2)}$$

When the loads R1 and R2 compete with each other, $V_{T1P} = V_{T2P}$ is satisfied, and each of the transformer T1 and T2 sides operates like the conventional flyback power supply. Current flows in the secondary side of each of the transformers T1 and T2, thus the excitation energy accumulated in each core decreases. When the excitation energy is equal to zero, no secondary-side current flows, and the induced voltages of the primary windings and the secondary windings are equal to zero. The induced voltage occurring at the primary winding of each transformer when the switch SW is turned off is called as a flyback voltage.

FIG. 10 shows a case where a load current on the load R2 side is larger than the load current on the load R1 side due to unbalance between the loads R1 and R2. When the load current increases, the fluctuation of the power supply of the output capacitor during ON-period of the switch SW increases, thus the voltage of the output capacitor drops as compared with a case where the load current is small. The voltages of the primary-side windings of the transformers T1 and T2 when the switch SW is turned off are equal to values represented by the expression 2. Since the load current on the load R2 side is large and the voltage $V_{D2}$ of the output capacitor C2 drops, $V_{T2P} < V_{T1P}$ is satisfied. However, since the primary-side windings of the transformers T1 and T2 are connected in parallel to each other, the voltage and current of each part vary so that $V_{T2P} = V_{T1P}$ is forcedly satisfied.

Since the voltage $V_{T2P}$ of the primary-side winding increases so as to approach to $V_{T1P}$, the forward voltage $V_{D2}$ of the rectifying diode D2 increases represented by the expression 2. The increase of the forward voltage $V_{D2}$ of the rectifying diode D2 means increase of the secondary-side current $I_{T2S}$ of the transformer T2. Due to the increase of the secondary-side current $I_{T2S}$, the current for charging the output capacitor C2 also increases, and the increase amount of the voltage V2 of the output capacitor C2 also increases.

Conversely, the primary-side voltage of the transformer T1 is forcedly reduced, and decrease of the forward voltage $V_{D1}$ of the rectifying diode D1 and decrease of the secondary-side current his of the transformer T1 occur, resulting in decrease of the charge current of the output capacitor C1 and reduction of the increase amount of the voltage V1.

Furthermore, currents $I_{T1P}$ and $I_{T2P}$ in a direction shown in FIG. 10 flow between the primary-side windings of the transformers T1 and T2. This primary winding current causes a part of the excitation energy accumulated in the core of the transformer T1 to migrate to the transformer T2. This direction of the primary winding current reduces the secondary-side winding current $I_{T1S}$ of the transformer T1, and increases the secondary-side winding current $I_{T2S}$ of the transformer T2.

That is, by connecting the primary-side windings of the respective transformers in parallel to each other, transfer of the excitation energy via the primary winding current when the switch SW is turned off occurs from a transformer side on which the drop rate of the output voltage is low to a transformer side on which the load current is large and the drop rate of the output voltage during ON-period of the switch SW is large. This transfer mechanism of the excitation energy suppresses the drop of the output voltage of the transformer side on which the load current is large. This effect of the transfer of the excitation energy is the same as the case where larger power is supplied to a secondary-side winding having a large load current when the switch SW is turned off in the centralized type 2-output flyback power supply shown in FIG. 5.

The transfer of the excitation energy described above suppresses the drop of the output voltage on the transformer side on which the load current is large, and also suppresses the increase of the output voltage on the transformer side on which the load current is small. Accordingly, since the fluctuation of the output voltage caused by the variation in magnitude of the load current is suppressed, the output voltage to be fed back for ON/OFF-time control of the switch SW may be selected from any one of the plural transformers.

When viewed from the switch SW, the transformers T1 and T2 of the distributed type power supply of FIG. 8 are equivalent to the transformer having the two secondary-side windings of the centralized type power supply of FIG. 5. Therefore, the same control manner and circuit as the centralized type power supply of FIG. 5 can be used as a controller for controlling the ON/OFF operation of the switch SW.

Figure 11:
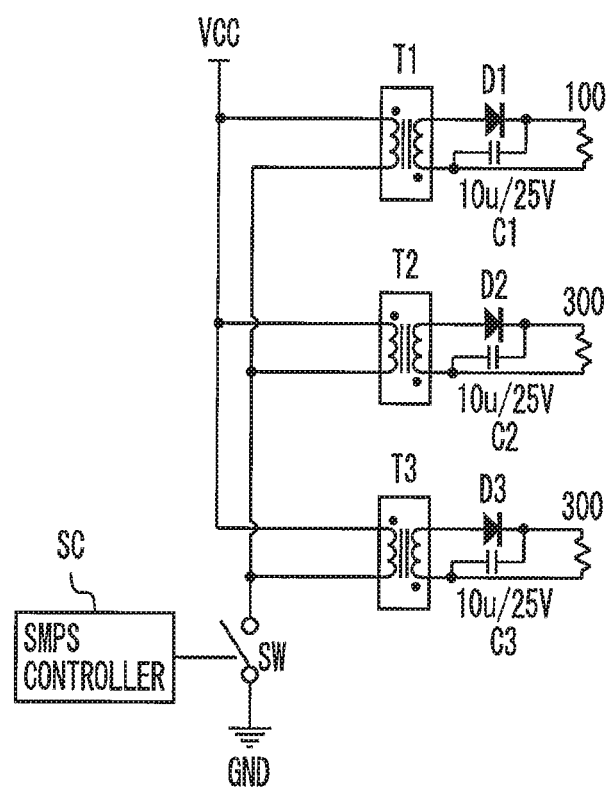
FIG. 11 is a diagram showing a distributed type 3-output flyback power supply according to a comparison example.

FIG. 11 is a diagram showing a distributed type 3-output flyback power supply according to a comparison example. The primary-side windings of transformers T1, T2 and T3 are connected in parallel to each other. The transformer T1, T2 and T3 have the same specification, and also have the same inductances of the primary-side winding number and secondary-side winding number. A resistance load is connected in parallel to the output capacitor of each transformer. The load of the transformer T1 is equal to 100Ω, the loads of the transformers T2 and T3 are equal to 300Ω, and the secondary-side load current of the transformer T1 is about three times that of the transformers T2 and T3.

Figure 12:
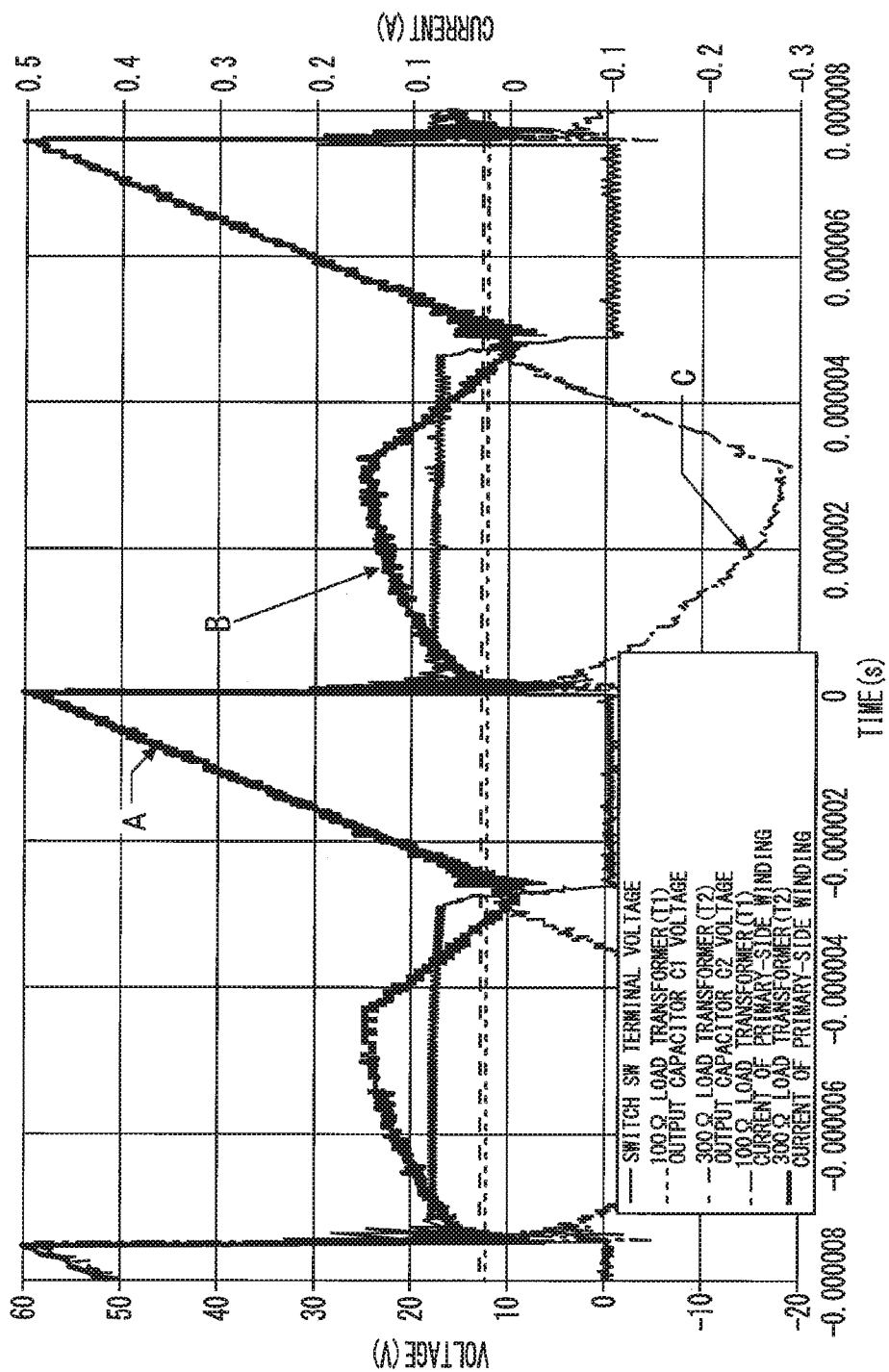
FIG. 12 is a diagram showing actually measured waveforms of a distributed type 3-output flyback power supply according to a comparative example.
Figure 13:
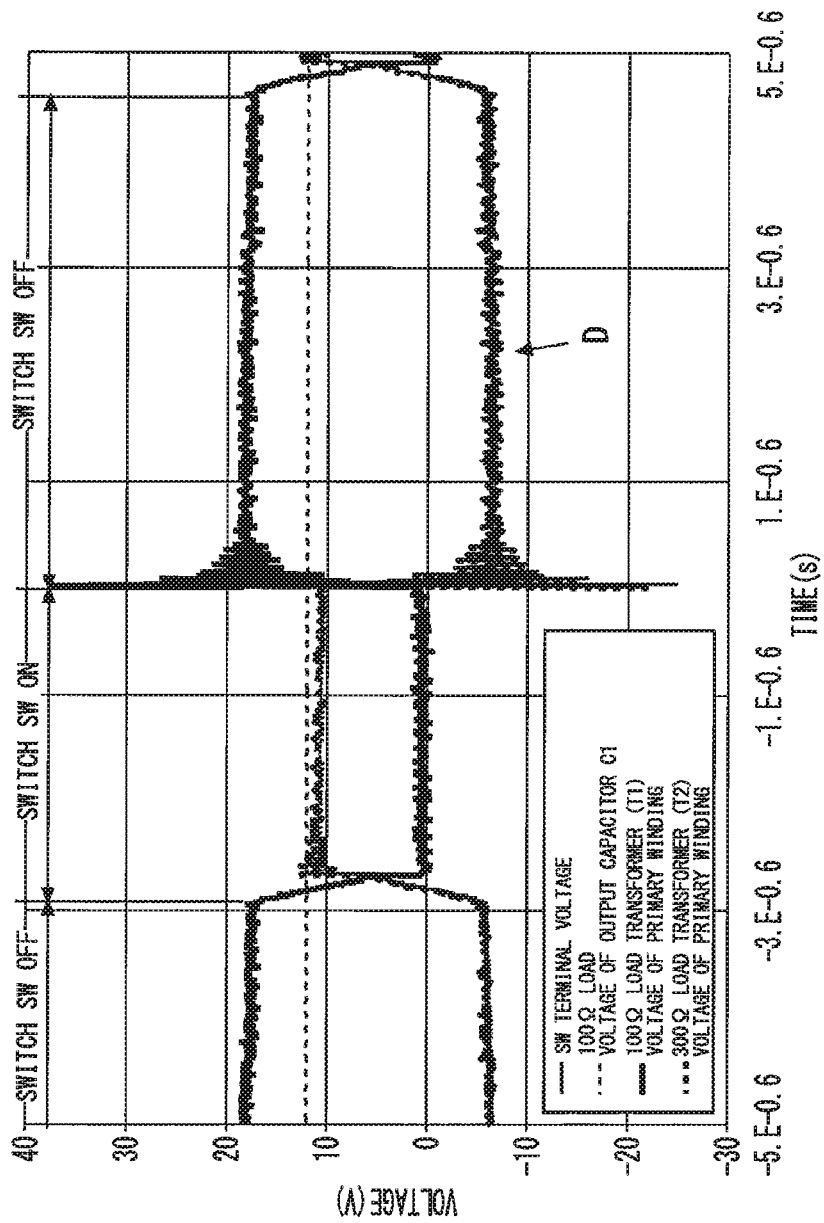
FIG. 13 is a diagram showing actually measured waveforms of a distributed type 3-output flyback power supply according to a comparative example.

FIGS. 12 and 13 are diagrams showing actually measured waveforms of a distributed type 3-output flyback power supply according to a comparative example. In the actually measured waveform of FIG. 12, since the transformers T1 and T2 have the same inductance of the primary-side winding during ON-period of the switch SW, the primary winding currents thereof are equal to each other (A of FIG. 12). A period for which the switch SW is turned off and an induced voltage occurs in the primary-side winding is called as a flyback period. During this flyback period, currents in opposite directions flow in the primary-side windings of the transformer T1 and the transformer T2. That is, current in such a direction as to increase the secondary-side induced voltage flows on the primary side of the high load transformer T1, and power is supplied from the low load transformer T2 (C of FIG. 12). On the other hand, current in such a direction as to decrease the secondary-side induced voltage flows on the primary side of the low load transformer T2, and power is supplied to the primary side of the high load transformer T1 (B of FIG. 12). This primary winding current causes a part of the excitation energy of the transformers T2 and T3 to migrate to the transformer T1. The total current of the primary-side winding currents of the transformers T2 and the transformer T3 flows in the primary-side winding of the transformer T1, thus the primary-side winding current of the transformer T2 is equal to the half of the winding current of the transformer T1. In the actually measured waveform of FIG. 13, since the primary-side windings of the transformers T1, T2 and T3 are connected in parallel to each other, it is apparent that the primary-side winding voltage of the transformer T1 having a large load current and the primary-side winding voltage of the transformer T2 having a low load current are equal to each other (D of FIG. 13).

In the present embodiment, since the number of the secondary-side windings of each transformer is equal to 2, the number of transformers of the present embodiment is equal to the half of that of the distributed type power supply in which the number of secondary-side windings of each transformer is equal to 1. Accordingly, the number of components can be reduced as compared with the distributed type power supply.

Furthermore, the total winding number of the transformers of the present embodiment is equal to 3×3=9, and the increase amount thereof is suppressed to about 29% as compared with the centralized type power supply whose total winding number is equal to 7. Accordingly, the total weight and the total cost of the transformers can be reduced as compared with the distributed type power supply. Furthermore, since only one controller is provided, the mounting area can be reduced as compared with the distributed type power supply shown in FIG. 3.

Furthermore, in the present embodiment, since the total winding number of each transformer is equal to 3 for the primary-side windings and the secondary-side windings, the transformer can be miniaturized and reduced in weight as compared with the transformer of the centralized type power supply. Accordingly, the miniaturization and the reduction in cost can be realized as compared with the centralized type power supply. Furthermore, as in the case of the distributed type power supply, resistance against vibration when the transformer is mounted on the printed circuit board is enhanced. Furthermore, as in the case of the distributed type power supply, when the transformer is mounted on the printed circuit board, the height can be reduced as compared with the centralized type power supply because of miniaturization of the transformer.

Paying attention to only the secondary-side outputs VDD1, VDD2 of the transformer T1, the same operation as that of the centralized type power supply shown in FIGS. 5 to 7 is performed. In a case where the load current of VDD1 is larger than that of VDD2, a secondary-side winding current larger than that on the VDD2 side flows on the VDD1 side when the switch SW is turned off, thereby suppressing fluctuation of the output voltage due to the magnitude of the load connected to the secondary-side output.

Furthermore, in a case where the secondary-side output power is not equal among the transformers T1, T2 and T3, as in the case of FIGS. 10 to 13, when the switch SW is turned off, current flows between the primary-side windings, and transfer of excitation energy from the transformer having lower secondary-side output power to the transformer having larger secondary-side output power occurs. That is, even when there is unbalance among the secondary-side loads, the drop of the secondary-side output voltage of a transformer having a heavier load can be suppressed by the transfer of the excitation energy from a transformer having a lighter load to the transformer having the heavier load when the switch SW is turned off. Accordingly, the fluctuation of the output voltage caused by the unbalance of the loads between the secondary-side windings can be suppressed.

Furthermore, a loss caused by wiring impedance or a surge voltage caused by wiring inductance in the transfer of the excitation energy when there is unbalance among loads causes a problem in the distributed type power supply. On the other hand, in the present embodiment, since wiring of the primary-side windings is simplified, reduction in inductance and reduction in impedance of wirings can be easily performed, thereby enabling reduction in the power loss caused by the wiring impedance and the surge voltage caused by the wiring inductance.

Second Embodiment

Figure 14:
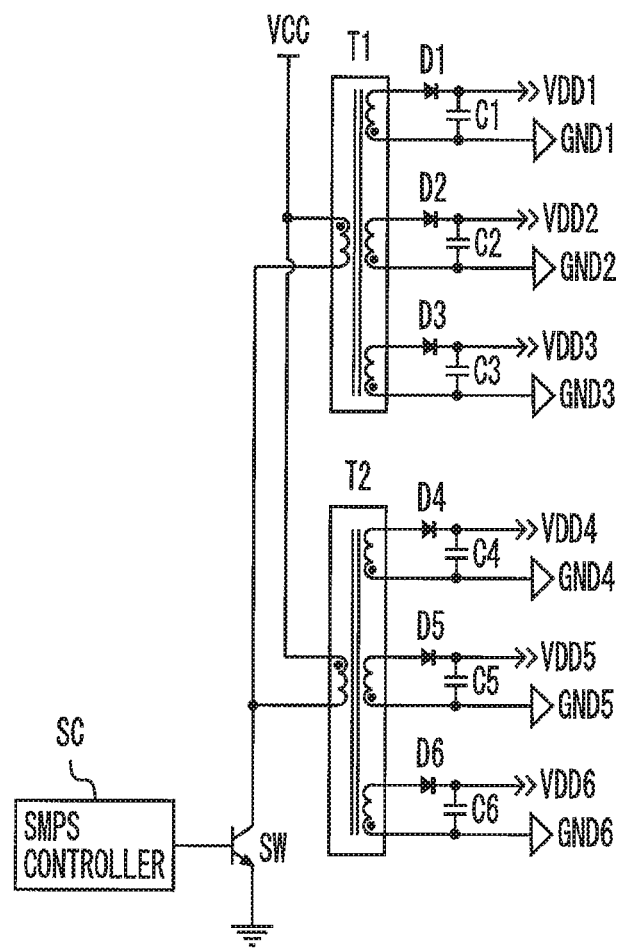
FIG. 14 is a circuit diagram showing a flyback power supply according to a second embodiment of the present invention.

FIG. 14 is a circuit diagram showing a flyback power supply according to a second embodiment of the present invention. In the present embodiment, the number of power supply outputs is set to 6 as in the case of the first embodiment, but the number of the secondary-side windings of each of the transformers T1 and T2 is set to 3. By changing the ratio of the winding numbers of the primary-side windings and the secondary-side windings as described above, the secondary-side output voltages can be individually set. The total winding number of the transformer is equal to 8, and the increase of the total winding number is suppressed to about 14% with respect to the total winding number of the centralized type power supply. Furthermore, since the outer shape dimension and weight of each transformer can be reduced as compared with the transformer of the centralized type power supply, the height of the overall power supply can be reduced as in the case of the conventional distributed type power supply, and the resistance against vibration when the transformer is mounted on the printed circuit board is enhanced. Furthermore, the number of parallel connections of the transformers is reduced as compared with the first embodiment, and the wiring layout between the primary-side windings can be easily performed.

Third Embodiment

Figure 15:
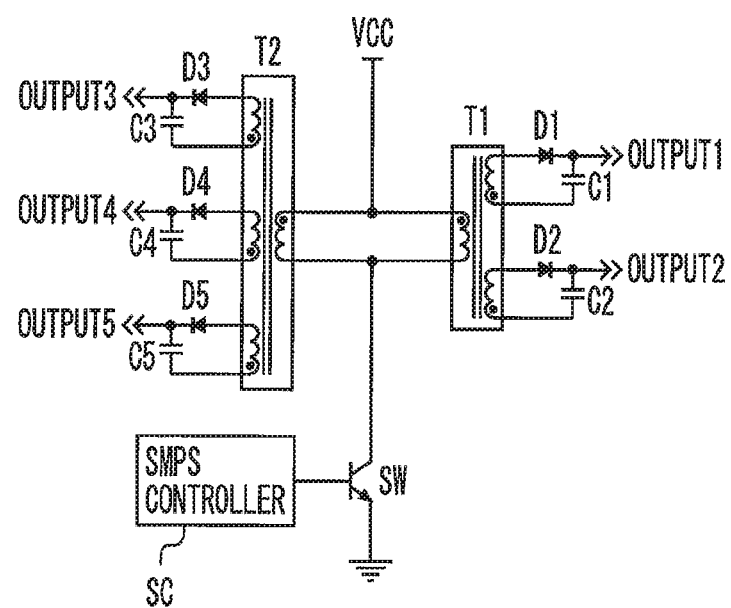
FIG. 15 is a circuit diagram showing a flyback power supply according to a third embodiment.

FIG. 15 is a circuit diagram showing a flyback power supply according to a third embodiment. In the first and second embodiments, the secondary-side winding numbers of the respective transformers are equal to each other. However, in the present embodiment, the secondary-side winding numbers of the transformers T1 and T2 are set to 2 and 3, respectively. Even when the secondary-side winding numbers of plural transformers are different from each other as described above, excitation energy migrates from a transformer having a small secondary-side load current to a transformer having a large load current when the switch SW is turned off, thereby suppressing drop of the secondary-side output voltage of the transformer having the large secondary-side load current. Furthermore, various output voltage specifications can be dealt with by combining only a few kinds of plural transformers according to the various output voltage specifications, and it is unnecessary to prepare many kinds of transformers for each specification.

Fourth Embodiment

Figure 16:
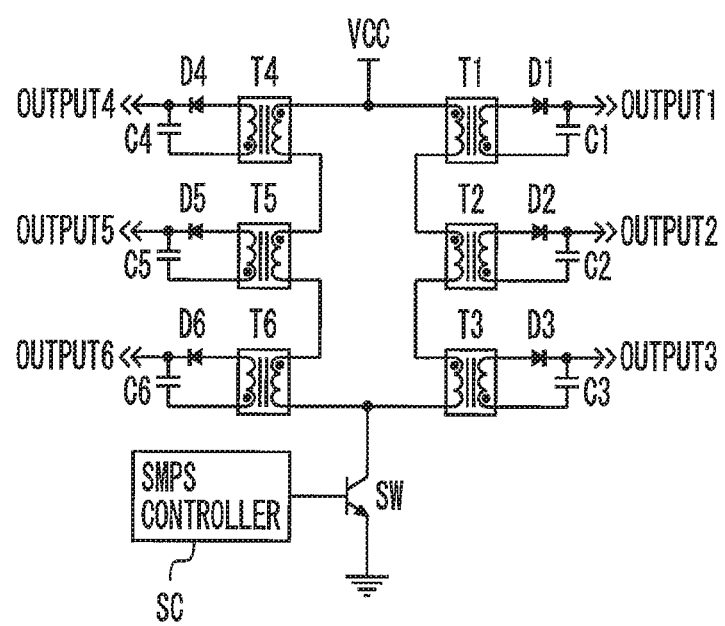
FIG. 16 is a circuit diagram showing a flyback power supply according to a fourth embodiment of the present invention.

FIG. 16 is a circuit diagram showing a flyback power supply according to a fourth embodiment of the present invention. The primary-side windings of first transformers T1, T2 and T3 are connected in series to each other, and the primary-side windings of second transformers T4, T5 and T6 are connected in series to each other. However, it is necessary that variation among secondary-side loads of the first transformers T1, T2 and T3 is small, and variation among secondary-side loads of the second transformers T4, T5 and T6 is also small. The primary-side windings of the second transformers T4, T5 and T6 are connected in parallel to the primary-side windings of the first transformers T1, T2 and T3. A switch SW turns on/off primary side currents of the first transformers T1, T2 and T3 and the second transformers T4, T5 and T6.

When the number of outputs is equal to 4 or more as described above, all the primary-side windings of the transformers are not connected in parallel to each other, but in-series connection and parallel-connection may be combined. However, it is necessary that transformers containing secondary-side loads having small variation are connected in series to each other.

Comparing a configuration in which all the transformers T1 to T6 are connected in parallel to each other, the collector current of the switch SW when the switch SW is turned on is equal to one third, which makes it possible to miniaturize the switch SW. That is, the load current of the switch SW can be reduced by the in-series connection of the primary-side windings of the transformers. Furthermore, the switch SW can be miniaturized by optimizing the number of in-series connections and the number of parallel connections.

Fifth Embodiment

Figure 17:
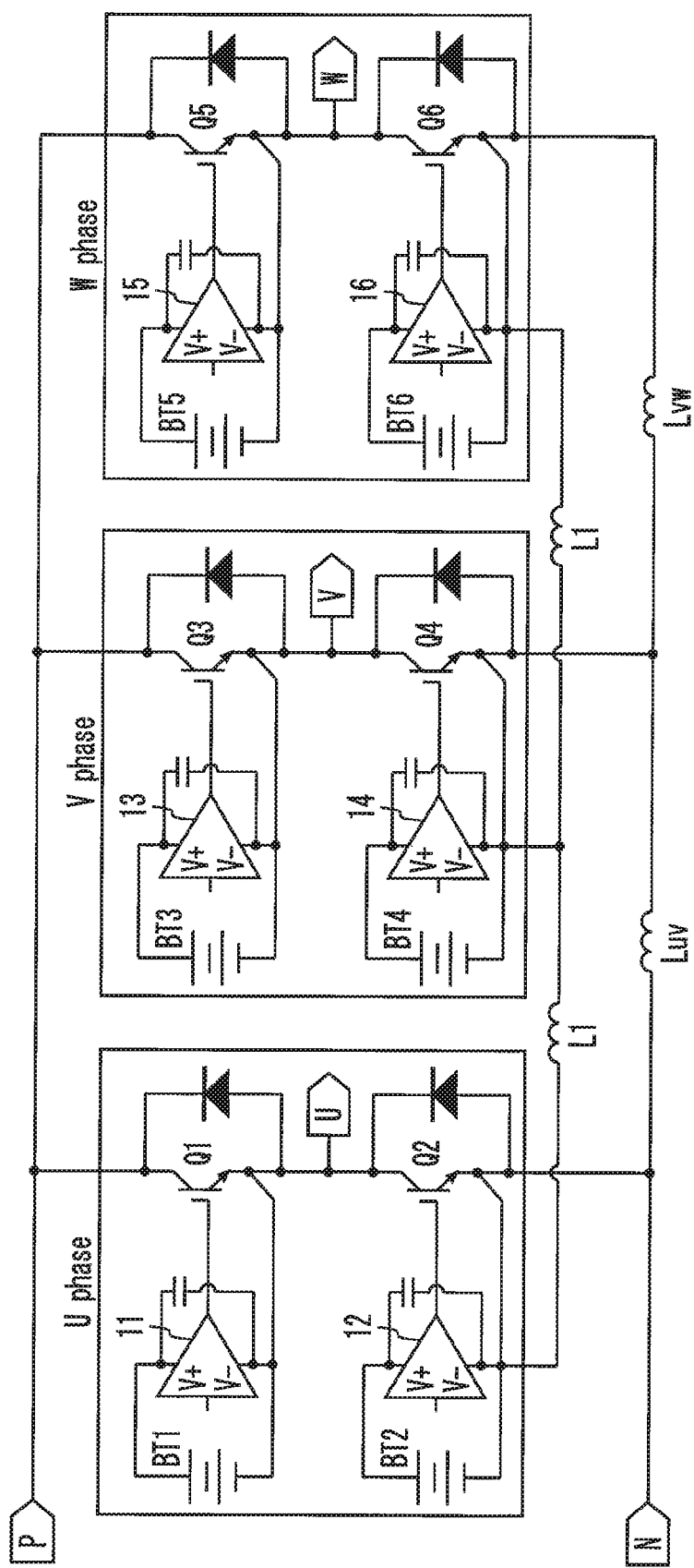
FIG. 17 is a circuit diagram showing an inverter according to a fifth embodiment of the present invention.

FIG. 17 is a circuit diagram showing an inverter according to a fifth embodiment of the present invention. Drive circuits 11 to 16 drive switching devices Q1 to Q6. Insulated power supplies BT1 to BT6 for supplying power to the drive circuits 11 to 16 are flyback power supplies according to the first to fourth embodiments. Accordingly, the transformer can be miniaturized as compared with the normal centralized type power supply, thus miniaturization and reduction in height of the inverter can be performed. Furthermore, a printed circuit board on which the drive circuits 11 to 16 and the insulated power supplies BT1 to BT6 are integrated can be easily miniaturized. Furthermore, the inverter having the flyback power supplies according to the first and second embodiments can be further miniaturized and reduced in weight. The inverter is not limited to the foregoing example, and the flyback power supplies according to the first to fourth embodiment may be used as an insulated power supply of an H bridge or 3-phase inverter used to drive a motor such as a single-phase or 3-phase motor.

Sixth Embodiment

Miniaturization and weight reduction are required for inverters for motors, generators, and chargers to be installed in electric vehicles, hybrid vehicles, plug-in hybrid vehicles, fuel cell vehicles and the like. Generally, in these electrically powered vehicles, miniaturization and weight reduction of electric components greatly contribute to improvement of fuel efficiency and cost reduction. Since the inverter is housed in an insulated case, the miniaturization of the inverter is advantageous for reduction in size and weight of the case for housing the inverter and reduction in cost. Therefore, the inverter according to the fifth embodiment is used for an electrically powered vehicle. As a result, miniaturization required by the electrically powered vehicle can be realized.

REFERENCE SIGNS LIST 11 to 16 drive circuit, BT1 to BT6 insulated power supply, C1 to C6 output capacitor, D1 to D6 rectifying diode, Q1 to Q6 switching device, SW switch, T1 to T6 transformer

The invention claimed is:
1. A flyback power supply comprising:
a plurality of transformers; and
a switch turning on/off primary side currents of the transformers,
wherein first terminals of primary-side windings of the transformers are directly connected in parallel to each other, second terminals of primary-side windings of the transformers are directly connected in parallel to each other,
each transformer includes a plurality of secondary-side windings,
the plurality of secondary-side windings supply power to a plurality of different loads independent from each other, respectively,
each load has a reference potential different from a primary side reference potential, and
the transformers are configured to accumulate excitation energy in cores of the transformers while the switch is turned on, and transfer, through the primary side currents flowing in the primary-side windings, the accumulated energy between the cores of the transformers directly connected in parallel while the switch is turned off.
2. The flyback power supply according to claim 1, wherein secondary-side winding numbers of the transformers are different from each other.
3. An inverter comprising the flyback power supply according to claim 1.
4. An electrically powered vehicle comprising the inverter according to claim 3.
5. A flyback power supply comprising:
a plurality of first transformers;
a plurality of second transformers; and
a switch turning on/off primary side currents of the first and second transformers,
wherein
primary-side windings of the first transformers are connected in series to each other,
primary-side windings of the second transformers are connected in series to each other and connected in parallel to the primary-side windings of the first transformers, and
each of the primary-side windings of the first and second transformers corresponds to a respective secondary-side winding.
6. An inverter comprising the flyback power supply according to claim 5.
7. An electrically powered vehicle comprising the inverter according to claim 6.

* * * * *